United States Patent [19]
Bodine

[11] 3,886,846
[45] June 3, 1975

[54] METHOD FOR TESTING ACCURACY OF MACHINE TOOL CONTROL PROGRAMS

[76] Inventor: Roger E. Bodine, 17541 Santa Paula Circle, Fountain Valley, Calif. 92708

[22] Filed: Mar. 8, 1971

[21] Appl. No.: 122,192

[52] U.S. Cl. .................................. 90/11 C; 90/13 C
[51] Int. Cl. ............................................... B23c 1/16
[58] Field of Search ...... 90/11 C, 13 R, 13 C, 11 R; 235/151.11

[56] References Cited
UNITED STATES PATENTS

| | | | |
|---|---|---|---|
| 3,085,476 | 4/1963 | Sloan et al. | 90/12 |
| 3,269,233 | 8/1966 | Lothmann | 90/13 C |
| 3,628,002 | 12/1971 | Meese | 90/13.9 |
| 3,635,124 | 1/1972 | Parsons | 90/11 C |

*Primary Examiner*—Gil Weidenfeld
*Attorney, Agent, or Firm*—Grover A. Frater

[57] ABSTRACT

The accuracy of computer control programs by which machine tools are made to remove material from a metal workpiece to produce a piece part is tested. The test includes the steps of forming a sample block whose size and shape need not conform to those of the workpiece but which is more readily formed than the workpiece and securing the part to the machine and then causing the machine to be controlled by the program under test. The program having cut away more than a desired amount, the cast plastic workpiece is treated to add an excess of material at the region improperly cut away and the program pertaining to that region is rerun.

1 Claim, No Drawings

METHOD FOR TESTING ACCURACY OF MACHINE TOOL CONTROL PROGRAMS

This invention relates to improvements in the method of testing the accuracy of control programs by which machine tools are made to cut and form workpieces to a selected size or shape.

A wide variety of machine tools that drill, grind, mill, turn, or otherwise form or shape workpieces by the removal of material from a metal blank, are made to operate in accordance with a "control program" that has been stored in the memory unit of an apparatus capable of directing operation of the machine. The control program may be stored in the form of punched holes in cards, or it may be stored on magnetic tape, or otherwise remembered. The invention is not limited by the manner in which the control program is remembered or by the way in which it is used to control the machine tool. However, it is particularly useful in connection with the testing of programs that are made independently of actual operation of the machine tool to form the workpiece that is to be reproduced by the machine tool under control of the program. The reason is that the opportunity for error in creating the program is greater when created from drawings of the workpiece rather than by actually forming the workpiece. However the program is created, it is an object of the invention to provide a reliable and inexpensive means for testing its accuracy. Especially in the case of large machine tools employed to make large metal parts, the cost of testing program accuracy by using a metal blank may be excessive if the program does prove to include an error. The invention is particularly useful in such cases.

The method can utilize materials that are more readily cut and formed than metals. In this connection one of the important attributes of the method is that the material employed to make the test workpiece need not have the same original shape that the unprocessed workpiece will have. One of the objects of the invention is to provide this feature which contributes greatly to reducing the cost of testing.

Only when there is an error in the program would the first workpiece be lost in the absence of pretesting. Because of this the use of a substitute material in the program test procedure is economically feasible only when the cost of such a test is much less in terms of money or time than the potential loss to be suffered by a program failure on an actual workpiece. One of the attributes of the method that makes it feasible in this circumstance is that it enables forming the workpiece on an accelerated basis by elevating the machine tool operating speed. To provide a method that makes that possible is another object of the invention.

The invention can be practiced using any of a rather wide range of substitutes for the material from which the finished workpieces are to be made. However, one class of those materials is so superior that the invention has special meaning when practiced with them. The thermosetting plastics will retain their shape when being cut, notwithstanding their being heated by friction. These materials have the added advantage that they introduce a minimum amount of friction in machine tool operation so that heating and wearing of the cutting tool itself is minimized. Because they are not abrasive and introduce little friction, they can be cut at higher speed. In most instances, the material that is cut away from a thermosetting plastic block is more easily removed from the vicinity of the cutting tool than metal cuttings. Further, thermosetting plastic material ordinarily has much less density than the metal for which it is a substitute, greatly facilitating handling when the workpiece has large size.

While these attributes are found in thermosetting plastic materials generally, there are two kinds of plastics that are particularly advantageous. One is polyurethane cast in foam form, preferably under pressure. Extended polyester resins are also particularly useful. Polyester resin can be extended, with or without subsequent dehydration, by the addition of water, or mixtures of oil or water, to the materials that are polymerized to form the polyester resin (see U.S. Pat. No. 3,256,219). Both classes of material are relatively inexpensive and both are admirably suited to use in the invention. Polyurethane foam has the advantage that density is easily controlled. It is preferred, when creating a block of polyurethane foam material for use in the invention, to begin with materials which would have less than desired density if permitted to foam without restraint. Such material is cast in a mold which restrains it so that the density of the finished block falls between 18 and 30 pounds per cubic foot. Forming the block in that fashion insures that the pores of the block will be sufficiently small as to have no effect upon accuracy either in forming the sample workpiece or in the making of measurements to verify that the control program is correct.

The invention has highest value when the program proves to have an error of the kind that results in removal of more than a desired amount of the sample piece. In that event, the next step in the method is to add a filler material to the overcut region of the sample. The filler material is advantageously an adhesive in putty form. When polyurethane or the extended polyesters form the sample block, than an epoxy in putty form is preferred. After the epoxy has polymerized and the program is retraced, the program is made to operate the machine tool to reform the sample part. The epoxy putty polymerizes to form a body of material not unlike the sample block. However, it exhibits superior qualities to make the repaired area stronger than it was before and that attribute permits a force distribution, in reaction to force applied by the machine tool, which diminishes the likelihood that finely machined adjacent areas of the sample block will be broken.

That same quality in the epoxy putty makes it useful in constructing sample blocks from a number of castings. The casting is done under pressure and the forces acting to expand the mold become very great. Because of this, it is preferred to form larger sample blocks from smaller cast blocks, one of whose dimensions is not very great. Blocks of polyurethane having density of 18 to 30 pounds per cubic foot are most economically produced in thicknesses of 3 inches and less. The standard production size for use in the invention is 4 feet by 4 feet by 3 inches thick. To form sample blocks having greater thickness, it is necessary only to putty blocks together to form the required sample block shape.

The use of epoxy putty as a corrective material with either polyurethane foam or the extended polyesters is especially advantageous first because it has certain essential physical attributes such as excellent adhesion, hardness, durability, nonshrinking, thixotropic, and has a relatively fast and easy cure procedure. In addition, the use of epoxy putty is advantageous because of certain qualities relative to those of polyurethane foams and extended polyesters. It is easy to give it distinguishing color, it adheres tenaciously while yet pliable enough to form and shape and it is harder when set.

Comparing the sample produced in the method with a standard is accomplished conventionally either by hand or by an automatic inspection tool.

Although I have shown and described certain specific embodiments of my invention, I am fully aware that many modifications thereof are possible. My invention, therefore, is not to be restricted except insofar as is necessitated by the prior art.

I claim:

1. The method of testing the accuracy of a control program by which a cutting machine is to cut a workpiece secured to the machine to selected size and shape which method comprises the steps of:

creating a block of material more easily worked than the material from which the workpiece is to be cut and which has a size greater than said selected size by casting the block of thermo setting plastic;

securing said block to the cutting machine in the position the workpiece is to occupy when secured to the machine;

causing the machine to cut said block in accordance with the control program;

causing the piece formed by cutting the block to be compared with a standard whereby errors in the shape of said piece are detected;

adding epoxy adhesive in putty form to areas of said block following cutting of the block by said machine under the control of said program;

altering the program; and causing the block, after hardening of the putty, to be recut by said machine in accordance with the modified control program.

* * * * *